United States Patent [19]
Santi

[11] Patent Number: 5,197,425
[45] Date of Patent: Mar. 30, 1993

[54] CRANKPIN BEARING FOR CONNECTING ROD OF INTERNAL COMBUSTION ENGINE

[75] Inventor: John Santi, West Allis, Wis.

[73] Assignee: Briggs & Stratton Corporation, Wauwatosa, Wis.

[21] Appl. No.: 925,801

[22] Filed: Aug. 4, 1992

[51] Int. Cl.$^5$ ............................................. F02B 25/32
[52] U.S. Cl. ............................. 123/197.3; 123/197.4; 74/579 E
[58] Field of Search ...................... 123/197.3, 197.4; 74/579 E

[56] References Cited

U.S. PATENT DOCUMENTS

| | | | |
|---|---|---|---|
| 3,559,503 | 2/1971 | Elsbett | 74/579 E |
| 3,871,245 | 3/1975 | McKindree | 74/579 E |
| 3,908,623 | 9/1975 | McWhorter | 123/197.4 |
| 4,114,961 | 9/1978 | Pithie | 79/579 E |
| 4,684,267 | 8/1987 | Fetouh | 74/579 E |
| 4,688,446 | 8/1983 | Ishikawa | 123/197.4 |
| 4,773,367 | 9/1988 | Kueny | 123/197.4 |

Primary Examiner—E. Rollins Cross
Assistant Examiner—M. Macy
Attorney, Agent, or Firm—Andrus, Sceales, Starke & Sawall

[57] ABSTRACT

A connecting rod for connecting a reciprocating piston to a rotating crankshaft of an internal combustion engine includes a crankpin bearing designed to seize on a crankpin and stop the engine when the crankpin bearing is operating in a failure mode, as for example due to the loss of oil lubrication. The crankpin bearing design includes a pair of circumferential shoulders formed between the inner circumferential surface of the bearing and the end walls of the bearing which results in the inhibition of heat transfer from the inner circumferential surface toward the outer circumferential surface so that the crankpin bearing expands radially inwardly in a failure mode. Stopping of the crankshaft is also facilitated by varying the torque of each cap screw used to assemble the crankpin bearing.

20 Claims, 2 Drawing Sheets

CRANKPIN BEARING FOR CONNECTING ROD OF INTERNAL COMBUSTION ENGINE

BACKGROUND OF THE INVENTION

The present invention relates to a connecting rod for a reciprocating piston of an internal combustion engine, and more particularly to an improved crankpin bearing for such a connecting rod.

Connecting rods typically have two-piece crankpin bearings for connecting the lower end of the rod to a crankpin of a crankshaft. The two-piece assembly comprises an arcuate-shaped bearing portion integrally formed on the lower end of the rod, and a cap member which is assembled to the bearing portion by means of a pair of cap screws. In the past, these cap screws have typically been identical in size and shape with each screw torqued with substantially identical forces to assemble the cap member on the arcuate-shaped bearing portion around the crankshaft.

Under normal operation, a hydrodynamic oil film is provided between the outer surface of the rotating crankpin of the crankshaft and the inner surface of the crankpin bearing. Thus, friction is minimized resulting in relatively low heat generation. However, when running in a failure mode, for example when an engine runs out oil, there is a loss of lubrication between the crankpin bearing and the crankpin, and heat rapidly builds up in the crankpin bearing. The loss of oil film results in increased friction between the rotating surfaces of the crankpin and crankpin bearing which in turn increases the load on the engine. This increased load also further increases friction. As a result there is an exponential increase in the amount of heat generated between these two rotating surfaces which occurs in a very short period of time. The temperature of the bearing thus increases at an extremely rapid rate, and if the engine is not stopped will reach the yield temperature of the components of the crankpin bearing resulting in self-destruction of the bearing and massive damage to the interior of the engine. It is therefore desirable to provide some mechanism for stopping the engine when running in a failure mode of operation so that the temperature of the crankpin bearing never reaches the yield temperature of its components.

SUMMARY OF THE INVENTION

A connecting rod for connecting a reciprocating piston to a rotating crankshaft of an internal combustion engine includes a crankpin bearing designed to stop the engine when running in a failure mode of operation. The design includes a combination of features incorporated into the crankpin bearing which cooperate together to result in the crankpin bearing itself acting as a brake on the crankshaft during a failure mode of operation to stop the engine prior to self destruction of the crankpin bearing. In order to accomplish this braking function it is desirable to provide a bearing design having a combination of structure and materials of construction that result in (a) low thermal conductivity from the inner circumferential surface to the outer circumferential surface of the crankpin bearing; (b) a high coefficient of friction at the inner surface of the crankpin bearing; and (c) a high coefficient of thermal expansion for the bearing.

One feature of the invention comprises means for inhibiting heat transfer from the bearing's inner circumferential surface toward the bearing's outer circumferential surface. As a result, the crankpin bearing expands a sufficient amount radially inwardly when heated during a failure mode from the frictional forces of a rotating crankpin in the crankpin bearing to seize on the crankpin before reaching the yield temperature of the crankpin bearing components. Another feature comprises assembling the cap of the two-piece crankpin bearing with different torque forces applied to the cap screws when connecting the crankpin bearing on the crankpin of a crankshaft. Accordingly, one cap screw is assembled with a greater torque than the other cap screw resulting in the joint formed between the cap and the arcuate-shaped bearing portion at the lower end of the connecting rod remaining closed so that upon being rapidly heated during a failure mode the crankpin bearing expands radially inwardly. At the same time, the opposite joint which is held together by a relatively lower torqued screw does not collapse or yield.

The means for inhibiting heat transfer may comprise a shoulder formed between the inner circumferential surface of the bearing and one or both of the end walls. Preferably, the shoulder extends along the entire circumference of the inner bearing surface. This concentrates the heat generated during a failure mode at the inner surface of the bearing and inhibits its rapid dissipation toward the outer surface of the bearing. The low torque cap screw may be assembled with between about 170–230 lbs. in. of torque, while the high torque screw may be assembled with between 298–402 lbs. in. of torque.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
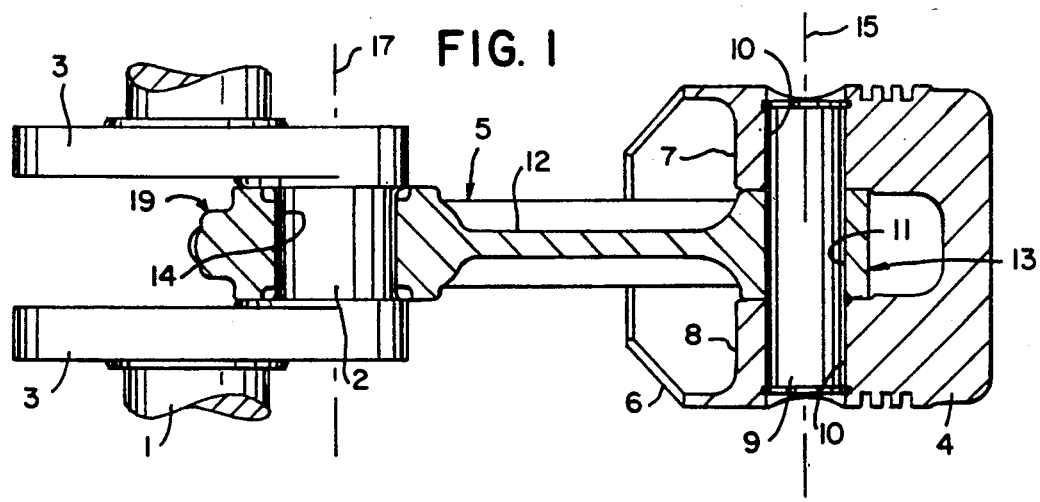
FIG. 1 illustrates one crank of an engine crankshaft and a piston and connecting rod in section taken in a plane containing the axes of the crankpin bearing and piston pin bearing of the connecting rod.
Figure 2:
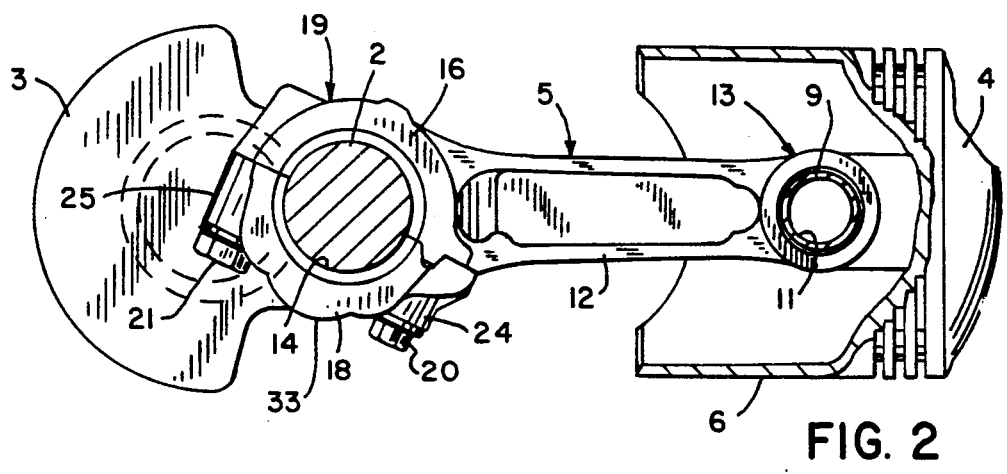
FIG. 2 is an elevational view taken normal to the bearing axes with parts of the crankshaft and piston broken away and in section.

Referring now to the drawings, FIGS. 1 and 2 illustrate a crankshaft 1 for an internal combustion engine (not shown). Crankshaft 1 includes a crankpin 2 having a circular cross-section disposed between and interconnecting a spaced pair of cranks or cheeks 3. A piston 4 is adapted to reciprocate in a corresponding combustion cylinder (not shown) of the engine and is connected to crankpin 2 of crankshaft 1 by a connecting rod 5. Connecting rod 5 transmits the rectilinear thrust of the forces of combustion within the cylinder on piston 4 to rotate crankshaft 1 in a conventional manner. Piston 4 includes a hollow skirt 6 which supports piston 4 in the cylinder walls of the engine. Piston 4 also includes a pair of bosses 7 and 8 formed oppositely on the inside of skirt 6 for supporting wrist pin 9 in aligned holes 10 which are bored through piston 4 to intersect at right angles the reciprocating axis of piston 4. When assembled, pin 9 extends through a piston pin bearing hole 11 formed in the upper end of rod 5 with rod 5 disposed between bosses 7 and 8 inside skirt 6.

Connecting rod 5 comprises a rigid elongate body or beam 12 formed in the shape of an "I", as shown best in FIG. 1. Beam 12 includes a piston pin bearing 13 at its upper end which defines piston pin bearing hole 11 having a first axis 15, and an arcuate shaped crankpin bearing portion 16 at its other or lower end defining part of a crankpin bearing hole 14 and a second axis 17 parallel to axis 15. A separable arcuate shaped cap member 18 is disposed in mating relationship with crankpin bearing portion 16 to form a crankpin bearing 19 when assembled to crankpin bearing portion 16. In order to assemble cap member 18 to crankpin bearing portion 16, a pair of bolts or screws 20 and 21 pass through bores 22 and 23 respectively formed in corresponding bosses 24 and 25 disposed on opposite sides of cap member 18, and are threadedly engaged with female threaded bores 26 and 27 respectively formed on opposite sides of crankpin bearing portion 16. Thus, crankpin bearing 19 is secured about crankpin 2 by turning down bolts 20 and 21, as will hereinafter be described.

Figure 3:
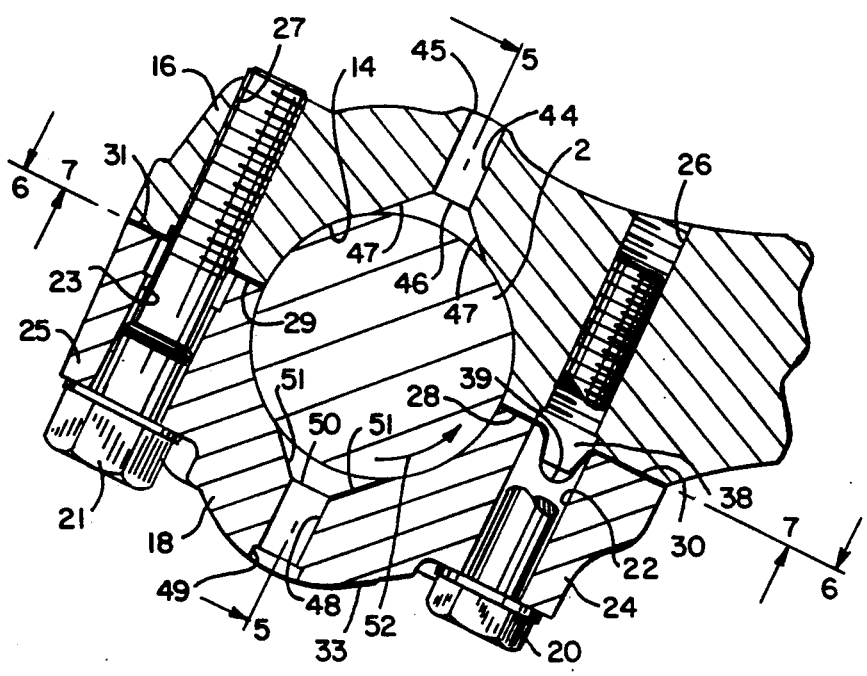
FIG. 3 is an enlarged cross sectional view of the crankpin bearing.
Figure 6:
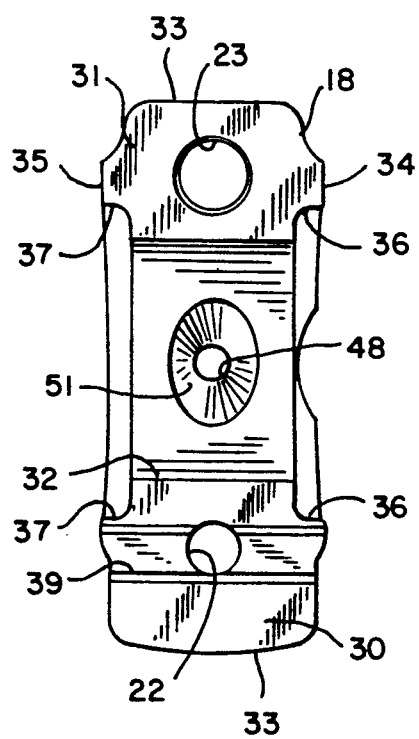
FIG. 6 is a plan view of the inside surface of the cap taken along the plane of the line 6—6 in FIG. 3.
Figure 7:
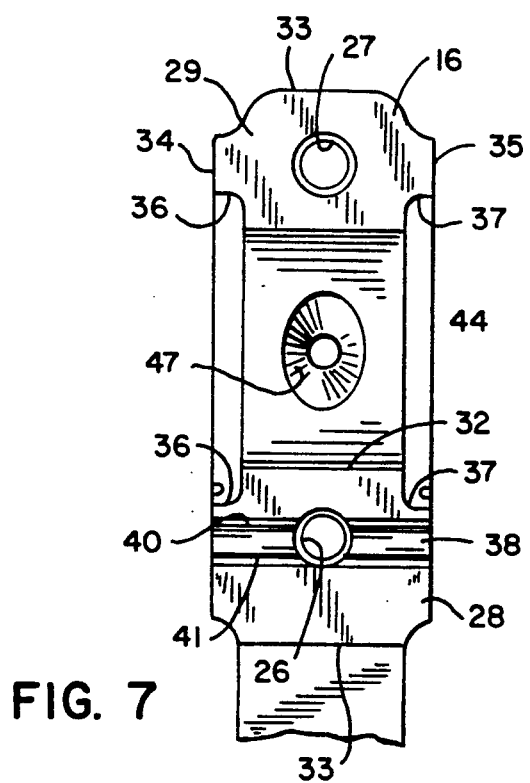
FIG. 7 is a plan view of the inside surface of the crankpin bearing taken along the plane of the line 7—7 in FIG. 3 and illustrating a second oil passageway for the crankpin bearing.

As shown best in FIGS. 3, 6 and 7, crankpin bearing portion 16 includes a pair of opposite, circumferentially spaced apart, radially and axially extending planar lower joint surfaces 28 and 29. In addition, cap member 18 includes a corresponding pair of opposite, circumferentially spaced apart, radially and axially extending planar upper joint surfaces 30 and 31 disposed in mating relationship with lower joint surfaces 28 and 29 respectively. Thus, when cap member 18 is secured to crankpin bearing portion 16, crankpin bearing 19 includes an inner circumferential bearing surface 32 which frictionally engages crankpin 2 during operation of the engine. Crankpin bearing 19 also includes an outer circumferential surface 33 which substantially comprises the exterior cylindrical surface of bearing 19, and a pair of opposite axially spaced planar end walls 34 and 35.

Under normal operation of the engine a hydrodynamic oil film is provided between the outer cylindrical surface of rotating crankpin 2 and inner surface 32 of bearing 19. During such normal operation friction between crankpin 2 and bearing 19 is thus minimized resulting in relatively low heat generation, as is conventional. However, when the engine runs in a failure mode of operation, as when the engine runs out of oil, there is a loss of lubrication between crankpin 2 and bearing 19. The loss of oil film results in increased friction between the rotating surfaces of crankpin 2 and crankpin bearing 19 which in turn increases the load on the engine. This increased load also further increases friction. As a result there is an exponential increase in the amount of heat generated at the interface between these two rotating surfaces which occurs in a very short period of time i.e. in about one second. Much of the heat generated is transferred or radiated in a radially outward manner from inner bearing surface 32 towards outer surface 33. Accordingly, during a failure mode of operation, and in particular during the very short period of time the above-described phenomena is occurring, inner bearing surface 32 is relatively much hotter than outer surface 33. For example outer surface 33 may be at normal operating temperatures of about 300° F. while inner surface 32 may quickly reach temperatures of up to about 1000° F. Such a temperature differential results in crankpin bearing 19 actually expanding radially inwardly since the relatively cooler outer surface 33 acts to prevent the radially outward heat expansion of bearing 19. In the past, it has been theorized that it is desirable to transfer heat as quickly as possible from inner surface 32 toward outer surface 33 so as to keep surface 32 as cool as possible. However, it has now been determined that when bearing 18 approaches its yield temperature it is more desirable to allow or facilitate expansion radially inwardly so that bearing 19 seizes upon crankpin 2 prior to reaching the yield temperature of the components of bearing 19. This prevents the components of bearing 19 from literally "breaking apart" or self-destructing and causing massive destruction within the engine. Accordingly, in order to provide lower thermal conductivity and thereby inhibit heat transfer from inner bearing surface 32 toward outer circumferential surface 33, crankpin bearing 19 includes a pair of circumferentially extending steps or shoulders 36 and 37 formed between end walls 34 and 35 and inner bearing surface 32. Shoulders 36 and 37 slow down or inhibit heat transfer toward outer surface 33 since there is less material in this area of bearing 19 to conduct heat radially outwardly and thus confines or concentrates the heat generated along surface 32.

Figure 4:
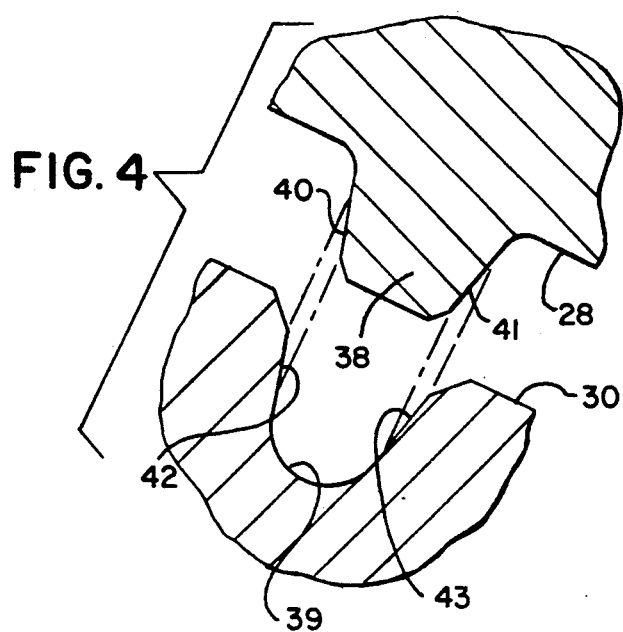
FIG. 4 is an enlarged exploded view illustrating the wedge-shape key and key-receiving groove for aligning the cap of the two-piece crankpin bearing.
Figure 5:
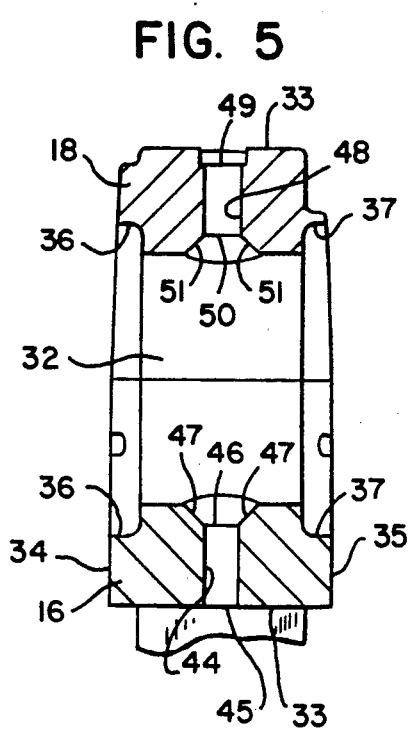
FIG. 5 is a cross sectional view of the crankpin bearing taken along the plane of the 5—5 in FIG. 3.

When assembling cap member 18 to crankpin bearing portion 16 it is desirable to provide some means for aligning these two components so that a smooth continuous surface is provided for inner bearing surface 32. In order to accomplish this, a wedge-shaped key 38 projects upwardly from lower joint surface 28. Key 38 is received within a tapered key-receiving groove 39 formed in upper joint surface 30 of cap 18. As shown best in FIGS. 6 and 7, key 38 and groove 39 extend axially the entire length of surfaces 28 and 30. As shown best in FIG. 4, key 38 includes a pair of opposite converging side walls 40, 41 tapered at an angle of about 105° with respect to surface 28. Groove 39, on the other hand, includes a pair of opposite converging sidewalls 42 and 43 tapered at an angle of about 104.7° with respect to upper surface 30. As shown best in FIGS. 6 and 7, lower joint surface 29 and upper joint surface 31 are both planar and contain no step, shoulder or key arrangement. Accordingly, during assembly, cap member 18 is forced onto crankpin bearing portion 16 so that the material forming walls 40-43 deform and permit an initial press fit assembly for these two components. Thereafter, bolts 20 and 21 are used to complete the assembly and secure cap member 18 to crankpin bearing portion 16 about crankpin 2. Key 38 and groove 39 also permit easy disassembly of cap member 18 from bearing portion 16 due to the "wedging" action thereof.

As shown best in FIG. 3, crankpin bearing 19 is adapted to receive crankpin 2 in its crankpin bearing hole 14. Crankpin 2 rotates within bearing 19 about axis 17 in a direction indicated by arrow 52. As a result, cap member 18 has an upstream end defined by surfaces 29 and 31 as well as a downstream end defined by surfaces 28 and 30 with respect to the direction of rotation of arrow 52 (see FIG. 3).

As previously noted herein, when crankpin bearing 19 approaches its yield temperature, as for example should the engine run out of oil, it is desirable that crankpin bearing 19 stop the engine i.e. seize on crankpin 2 before the temperature reaches a point where the components self destruct. As a further aid in enabling crankpin bearing 19 to seize upon crankpin 2 in such a situation, cap member 18 is secured to crankpin bearing portion 16 by bolts 20 and 21 which have different torque capabilities. Bolt 20 has a relatively low torque capability while bolt 21 has a relatively high torque capability. Accordingly, bolt 20 has a diameter relatively smaller than bolt 21 and is assembled with between about 170–230 lbs. in. of torque while bolt 21 is assembled with between about 298–402 lbs. in. of torque. Essentially, when approaching a failure mode, it is desirable to utilize crankpin bearing 19 as a brake to seize upon crankpin 2 prior to the destruction of the components, as described above. Thus, the high torque capability of bolt 21 maintains the joint between cap member 18 and bearing portion 16 defined by planar surfaces 29 and 31 i.e. the upstream end of cap member 18, closed during a failure mode. If this joint is allowed to open, bearing 19 would not expand sufficiently radially inwardly to seize on crankpin 2 and the engine and crankshaft would thus continue to run allowing the possibility of complete destruction of the crankpin bearing 19 and crankshaft 1. On the other hand, the low torque capability of bolt 20 facilitates the prevention of the opposite joint defined by planar surfaces 28 and 30 i.e. the downstream end of cap member 18 from collapsing or yielding during a failure mode. In other words, as crankshaft 1 rotates, the frictional forces developed are attempting to force joint surface 30 into joint surface 28. Thus, if too much torque is applied by bolt 20 to joint surfaces 28 and 30, these surfaces would become deformed and possibly yield to the point of self destruction. Such is prevented by the use of the lower torque capability bolt 20.

Referring now to FIGS. 3, 5, 6 and 7, there is illustrated a lubrication design for conveying oil into crankpin bearing 17 to improve lubrication distribution between the outer surface of crankpin 2 and inner bearing surface 32. This lubrication distribution means comprises a bore 44 extending through crankpin bearing portion 16 from outer circumferential surface 33 to inner bearing surface 32. Bore 44 includes an exterior inlet 45 opening to outer surface 33 and an interior outlet 46 opening into the crankpin bearing hole 11. As shown best in FIGS. 3 and 5, outlet 46 includes chamfered sidewalls 47 having an angle of between about 30° to about 60° with respect to bore 44. Preferably, sidewalls 47 are chamfered at an angle of 45° with respect to bore 44. Also, it has been found that it is preferred that outlet 46 have an oval cross-section with the cross-sectional area of outlet 46 being at least twice the cross-sectional area of bore 44. In addition, outlet 46 is recessed from inner bearing surface 32 a depth of no more than approximately one-half the thickness of bearing 19 and preferably about one-half the diameter of bore 44. It has been found that the depth and area of outlet 46 as well as the chamfer angle of sidewalls 47 is critical to distributing sufficient oil to the interior of bearing 19. To this end, an identical lubrication opening is formed in cap member 18 at a location diametrically opposite from that of outlet 46 formed in crankpin bearing portion 16. As shown best in FIG. 6, this second opening is identical in structure to the first opening and includes a bore 48, inlet 49, outlet 50 and chamfered sidewalls 51.

It should be particularly noted that although connecting rod 5 is illustrated as being employed with a single cylinder engine, the present invention is readily applicable to multiple cylinder engines. Also, although key 38 is illustrated as projecting from joint surface 28, it could be located on any of the surfaces 28–31 so long as groove 39 is located on the corresponding mating surface opposite thereto.

I claim:

1. A connecting rod for connecting a piston to a crankshaft of an internal combustion engine, comprising:
   a rigid beam member having an elongate body including a piston pin bearing at one end of said body defining a piston pin bearing hole having a first axis, and an arcuate-shaped crankpin bearing portion at its other end defining part of a crankpin bearing hole and a second axis parallel to said first axis;
   an arcuate-shaped cap member adapted to mate with said crankpin bearing portion to define a crankpin bearing having an inner circumferential surface, an outer circumferential surface and a crankpin bearing hole when assembled together, said crankpin bearing adapted to receive a crankpin in said crankpin bearing hole rotating in a direction about said second axis; and
   means for providing low thermal conductivity from the inner circumferential surface to the outer circumferential surface of said crankpin bearing so that when a sufficient temperature differential develops between the inner circumferential surface and outer circumferential surface said crankpin bearing expands a sufficient amount radially inwardly to seize on the crankpin before reaching the yield temperature of said crankpin bearing.

2. The connecting rod of claim 1 wherein said means for providing low thermal conductivity comprises means for inhibiting heat transfer radially outwardly from said inner circumferential surface toward said outer circumferential surface.

3. The connecting rod of claim 2 wherein said cap member further includes a pair of opposite axially spaced planar end walls and said means for inhibiting heat transfer comprises a shoulder formed between said inner circumferential surface and one of said end walls.

4. The connecting rod of claim 3 wherein said shoulder extends along the entire circumference of said inner surface.

5. The connecting rod of claim 3 further including a second shoulder formed between said inner circumferential surface and the other of said end walls.

6. The connecting rod of claim 5 wherein both of said shoulders extend along the entire circumference of said inner surface.

7. A connecting rod for connecting a piston to a crankshaft of an internal combustion engine comprising:
   a rigid beam member having an elongate body including a piston pin bearing at one end of said body defining a piston pin bearing hole having a first axis and an arcuate-shaped crankpin bearing portion at its other end defining part of a crankpin bearing hole and a second axis parallel to said first axis, said crankpin bearing portion including a pair of opposite circumferentially spaced apart, radially and axially extending lower joint surfaces;
   an arcuate-shaped cap member having a pair of opposite circumferentially spaced apart, radially and axially extending upper joint surfaces disposed in mating relationship with said lower joint surfaces, said cap member and crankpin bearing portion define a crankpin bearing having an inner circumferential surface, an outer circumferential surface and a crankpin bearing hole when assembled together, said crankpin bearing adapted to receive a crankpin in said crankpin bearing hole rotating in a direction about said second axis and said cap member having an upstream end and a downstream end with respect to said direction of rotation;

means for facilitating expansion of the inner circumferential surface of said crankpin bearing radially inwardly comprising securing means for releasably securing said cap member to said crankpin bearing portion wherein said upper and lower joint surfaces mate with one another to define said crankpin bearing and said crankpin bearing hole, said securing means providing a greater clamping force between the joint surfaces at the upstream end of said cap member than the clamping force between the joint surfaces at the downstream end of said cap member.

8. The connecting rod of claim 7 wherein said securing means comprise a pair of cap screws.

9. The connecting rod of claim 8 wherein one of said cap screws is located at the upstream end of said cap member and the other of said cap screws is located at the downstream end of said cap member.

10. The connecting rod of claim 9 wherein said one cap screw is assembled with between about 170–230 lbs. in. of torque.

11. The connecting rod of claim 10 wherein said other cap screw is assembled with between about 298–402 lbs. in. of torque.

12. A connecting rod for connecting a piston to a crankshaft of an internal combustion engine comprising:
   a rigid beam member having an elongate body including a piston pin bearing at one end of said body defining a piston pin bearing hole having a first axis and an arcuate-shaped crankpin bearing portion at its other end defining part of a crankpin bearing hole and a second axis parallel to said first axis, said crankpin bearing portion including a pair of opposite, circumferentially spaced apart, radially and axially extending lower joint surfaces;
   an arcuate-shaped cap member having a pair of opposite, circumferentially spaced apart, radially and axially extending upper joint surfaces disposed in mating relationship with said lower joint surfaces, said cap member and crankpin bearing portion define a crankpin bearing having an inner circumferential surface, an outer circumferential surface and a pair of opposite axially spaced planar end walls together with a crankpin bearing hole when assembled together, said crankpin bearing adapted to receive a crankpin in said crankpin bearing hole rotating in a direction about said second axis and said cap member having an upstream end and a downstream end with respect to said direction of rotation;

means for facilitating expansion of the inner circumferential surface of said crankpin bearing radially inwardly comprising
   (a) means for inhibiting heat transfer radially outwardly from said inner circumferential surface so that said crankpin bearing expands a sufficient amount radially inwardly when heated from frictional forces of a rotating crankshaft in said crankpin bearing to seize on the crankshaft before reaching the yield temperature of said crankpin bearing and
   (b) securing means for releasable securing said cap member to said crankpin bearing portion wherein said upper and lower joint surfaces mate with one another to define said crankpin bearing and said crankpin bearing hole, said securing means providing a greater clamping force between the joint surfaces at the upstream end of said cap member than the clamping force between the joint surfaces at the downstream end of said cap member.

13. The connecting rod of claim 12 wherein said means for inhibiting heat transfer comprises a shoulder formed between said inner circumferential surface and one of said end walls.

14. The connecting rod of claim 13 wherein said shoulder extends along the entire circumference of said inner surface.

15. The connecting rod of claim 13 further including a second shoulder formed between said inner circumferential surface and the other of said end walls.

16. The connecting rod of claim 15 wherein both of said shoulders extend along the entire circumference of said inner surface.

17. The connecting rod of claim 12 wherein said securing means comprise a pair of cap screws.

18. The connecting rod of claim 17 wherein one of said cap screws is located at the upstream end of said cap member and the other of said cap screws is located at the downstream end of said cap member.

19. The connecting rod of claim 18 wherein said one cap screw is assembled with between about 170–230 lbs. in. of torque.

20. The connecting rod of claim 19 wherein said other cap screw is assembled with between about 298–402 lbs. in. of torque.

* * * * *